(12) United States Patent
Maor et al.

(10) Patent No.: US 11,076,673 B2
(45) Date of Patent: Aug. 3, 2021

(54) LICE COMB

(71) Applicant: Moshe Maor, Welshpool (AU)

(72) Inventors: Moshe Maor, Welshpool (AU);
Edward Khoury, Bateman (AU)

( * ) Notice: Subject to any disclaimer, the term of this patent is extended or adjusted under 35 U.S.C. 154(b) by 340 days.

(21) Appl. No.: 16/310,781

(22) PCT Filed: Jun. 19, 2017

(86) PCT No.: PCT/AU2017/050617
§ 371 (c)(1),
(2) Date: Dec. 17, 2018

(87) PCT Pub. No.: WO2017/219074
PCT Pub. Date: Dec. 28, 2017

(65) Prior Publication Data
US 2019/0150584 A1 May 23, 2019

(30) Foreign Application Priority Data
Jun. 24, 2016 (AU) ................................ 2016902483

(51) Int. Cl.
*A45D 24/30* (2006.01)
*A45D 24/32* (2006.01)
(Continued)

(52) U.S. Cl.
CPC ............ *A45D 24/30* (2013.01); *A01K 13/002* (2013.01); *A45D 24/02* (2013.01); *A45D 24/10* (2013.01); *A45D 24/32* (2013.01)

(58) Field of Classification Search
CPC ........ A45D 24/30; A45D 24/02; A45D 24/10; A45D 24/32; A45D 24/36; A45D 24/42;
(Continued)

(56) References Cited

U.S. PATENT DOCUMENTS

| 3,169,843 A * | 2/1965 | Campbell | A45D 24/32 |
| | | | 55/467 |
| 3,981,313 A * | 9/1976 | Burke | A45D 20/52 |
| | | | 132/118 |

(Continued)

FOREIGN PATENT DOCUMENTS

WO   WO-2015077824 A1 *  6/2015  ........... A01K 13/002

*Primary Examiner* — Nicholas D Lucchesi
(74) *Attorney, Agent, or Firm* — Tope-McKay & Associates

(57) ABSTRACT

A lice comb (10) comprising a main housing (12) including a first aperture (15) at a first end (14) thereof and a second aperture (17) at a second end (16) thereof. A fan unit (18) draw airs in through the first aperture (15) and expels air outwardly through the second aperture (17). A comb module (38) is rotatably secured to a comb support unit (34) adjacent a first end of the main housing (12). The comb module (38) comprises a comb body (46) and a tine module (48) having a plurality of teeth (44). The comb body (46) includes a channel (52) extending from a first longitudinal side adjacent the tine module (48) to a second longitudinal side thereof and a tine slot (54) is located adjacent the first end of the channel (52) to receive the tine module (48) such that air drawn in through the channel (52) passes across a first surface of the teeth (44).

16 Claims, 19 Drawing Sheets

(51) Int. Cl.
*A45D 24/02* (2006.01)
*A01K 13/00* (2006.01)
*A45D 24/10* (2006.01)

(58) Field of Classification Search
CPC ........ A45D 24/04; A45D 29/05; A45D 29/14; A01K 13/002; A01K 13/00; A46B 15/0059; A46B 15/0051; A47L 9/02; A47L 9/14; A47L 9/1445
See application file for complete search history.

(56) References Cited

U.S. PATENT DOCUMENTS

| | | | | |
|---|---|---|---|---|
| 4,485,583 A * | 12/1984 | Planty | .................. | A01K 13/002 15/327.1 |
| 4,630,329 A * | 12/1986 | Shores | ................ | A01K 13/002 15/352 |
| 4,799,460 A * | 1/1989 | Kuhl | .................... | A01K 13/001 119/606 |
| 5,175,960 A * | 1/1993 | Wade | ...................... | A01M 1/06 43/134 |
| 5,211,131 A * | 5/1993 | Plyler | ...................... | A01J 7/04 119/606 |
| 5,339,840 A * | 8/1994 | Koppel | ................ | A01K 13/002 119/625 |
| 2002/0073549 A1* | 6/2002 | McCambridge | ........ | B26B 19/44 30/41.5 |
| 2011/0005540 A1* | 1/2011 | Maor | .................... | A45D 24/30 132/147 |
| 2011/0308034 A1* | 12/2011 | Powers | .................... | A47L 9/30 15/324 |
| 2017/0258197 A1* | 9/2017 | Maor | .................. | A01K 13/002 |

\* cited by examiner

LICE COMB

FIELD OF THE INVENTION

The present invention relates to a comb for removing lice from hair.

BACKGROUND TO THE INVENTION

Lice combs incorporating suction to capture lice are known. The present invention relates to such a lice comb having an improved construction aimed at making the device operate more efficiently and providing for more effective capture and disposal of lice.

SUMMARY OF THE INVENTION

According to one aspect of the present invention there is provided a lice comb comprising:
a main housing including a first aperture at a first end thereof and a second aperture at a second end thereof;
a fan unit having an impeller provided within the main housing to draw air in through the first aperture and expel air outwardly through the second aperture; and
a comb module rotatably securable to a comb support unit adjacent a first end of the main housing, the comb module comprising a comb body and a tine module having a plurality of teeth;
wherein the comb body includes a channel extending from a first longitudinal side adjacent the tine module to a second longitudinal side thereof and wherein a tine slot is located adjacent the first end of the channel to receive the tine module such that air drawn in through the channel passes across a first surface of the teeth.

Preferably the tine slot comprises an elongate slot located adjacent and parallel to the channel and the tine module comprises an elongate base from which the teeth extend such that the base is received within the tine slot.

Preferably a latching mechanism is provided such that the tine module is engaged in the tine slot.

Preferably the latching mechanism comprises notches adjacent ends of the tine slot which receive protrusions on ends of the base of the tine module.

In a preferred embodiment the second longitudinal side of the comb body is provided with a tube to divert air that has passed through the channel and wherein the tube is mounted for rotation relative to the main housing to allow the orientation of the teeth to be varied.

Preferably ends of the tube are rotatably mounted to end mounts, the end mounts having internal chambers to receive air that has passed through the tube.

In a preferred embodiment the comb support unit includes a comb support housing and the comb module is secured adjacent a first end of the comb support housing and wherein a first internal conduit is provided within the comb support housing to transfer air from the end mounts to a second end of the comb support housing.

In a preferred embodiment, the internal first conduit is Y-shaped and includes a pair of tube portions at a first end thereof to connect to the end mounts.

In one embodiment the end mounts each comprise a cylindrical tube being open at a first end and closed at a second end and having a port on a side thereof adjacent the second end which connects to ends of the tube portions.

Preferably the comb support unit includes also a latch member which is moveable to fix the comb module in a plurality of angular orientations relative to the comb support housing.

Preferably the latch member includes lugs which engage in holes on the tube and the latch member is spring biased to move towards the tube.

In one embodiment, an actuator extends outwardly through the comb support housing such that the actuator can be slid to move the latch member away from the tube, thereby disengaging the lugs from the holes to allow rotation of the comb module.

Preferably a filter bag is receivable in a first end of the main housing, the filter bag including a rim around the first end thereof to be received in a groove in the first end of the main housing such that the filter bag may be released from the main housing by tipping the main housing.

In a preferred embodiment the first internal conduit is received within the rim of the filter bag to engage with a lip portion on an inner surface of the rim.

Preferably the second end of the first conduit includes an outer flange having an annular channel therein on a side facing the main housing, the channel including a seal against which an end of the rim of the filter bag engages.

Preferably a flexible cover is provided across the open first end of the filter bag.

In a preferred embodiment the first end of the filter bag is provided with a cross member extending diametrically across the first end of the filter bag having a lug received through a hole in the flexible cover.

Preferably the flexible cover includes slots extending inwardly from opposed sides thereof such that the slots are located to extend above and along the cross member to allow the flexible cover to be drawn inwardly into the filter bag on either side of the cross member by the flow of air.

Preferably the periphery of the flexible cover is received under an inner rim provided on the filter bag.

In a preferred embodiment, the main housing includes an internal second conduit such that a first end thereof is integrally formed with the groove in the first end of the main housing and a second end is located adjacent the impeller.

Preferably a face plate is provided on a side of the impeller adjacent the second internal conduit, the face plate including an opening therein such that the second end of the second internal conduit engages around the periphery of the opening in the face plate.

Preferably an end plate provided in the second end of the main housing is set inwardly from the second end such that a cylindrical rim portion is defined around the second end, the rim portion including one or more notches such that the power cord may extend outwardly through one of the notches while the lice comb is standing on the cylindrical rim portion.

Preferably the main housing comprises a first housing portion adjacent the first end and a second housing portion located adjacent the second end and the first portion comprises a transparent material.

Preferably the a tine module recess is provided in a side surface of the comb support unit for receiving a further tine module.

BRIEF DESCRIPTION OF THE DRAWINGS

The invention will now be described, by way of example, with reference to the following drawings, in which:

FIG. 8a is a side cross sectional view of the lice comb of FIG. 1;

FIG. 8b is a close up view of Detail A of FIG. 8a;

DETAILED DESCRIPTION OF PREFERRED EMBODIMENTS

Figure 1:
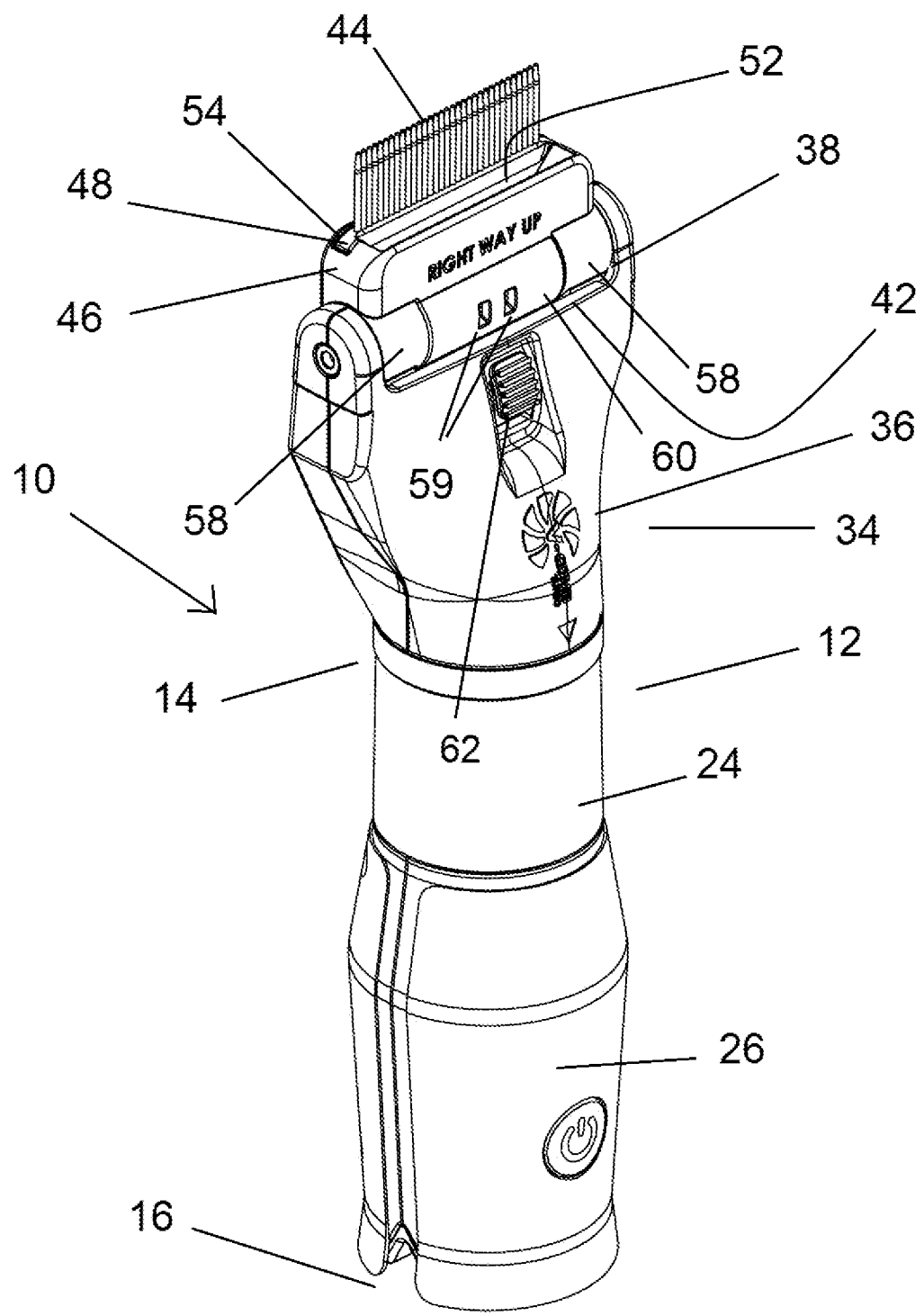
FIG. 1 is an upper perspective view of a lice comb in accordance with the present invention.
Figure 2:
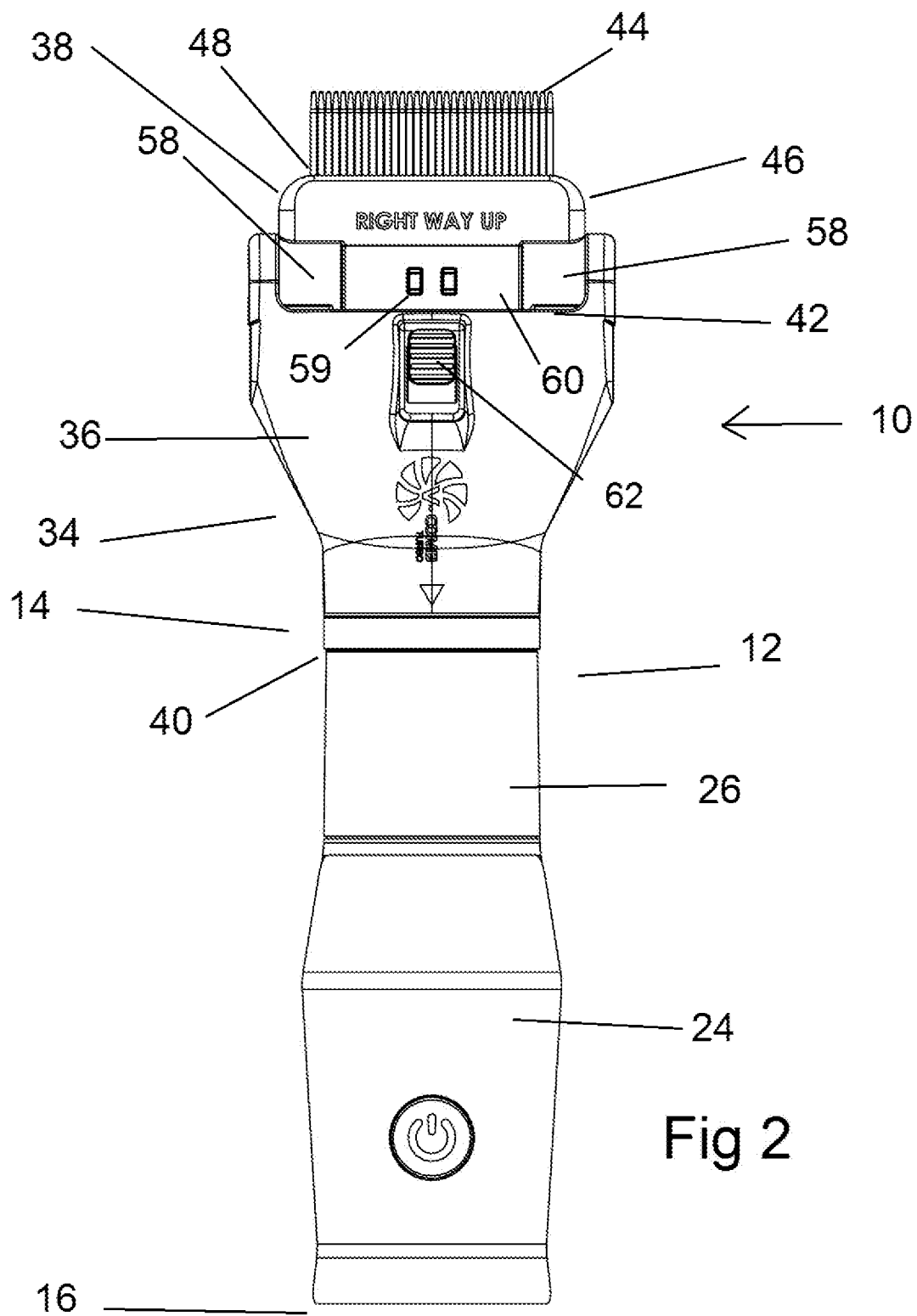
FIG. 2 is a top view of the lice comb of FIG. 1.
Figure 3:
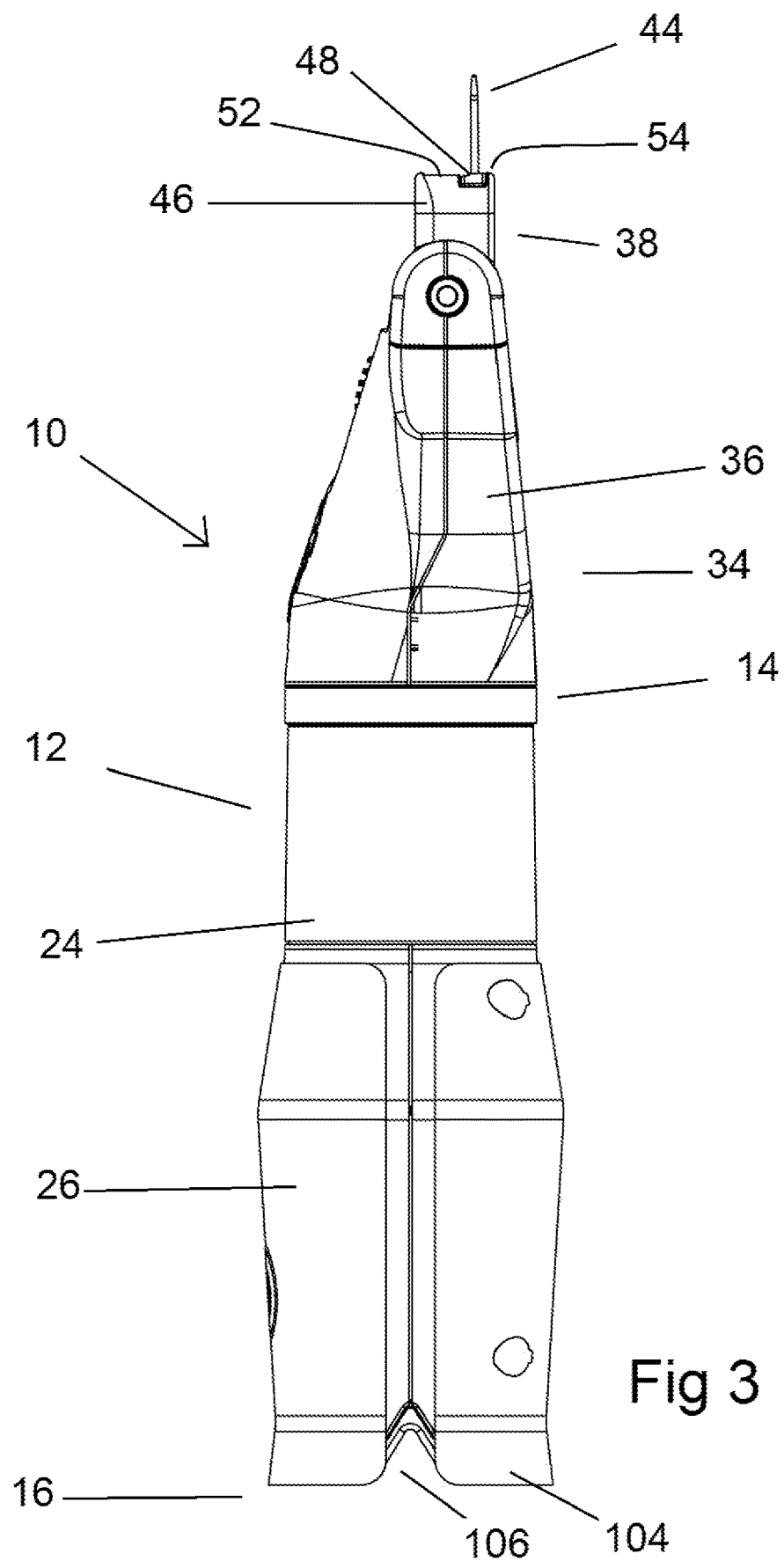
FIG. 3 is a side view of the lice comb of FIG. 1.
Figure 4:
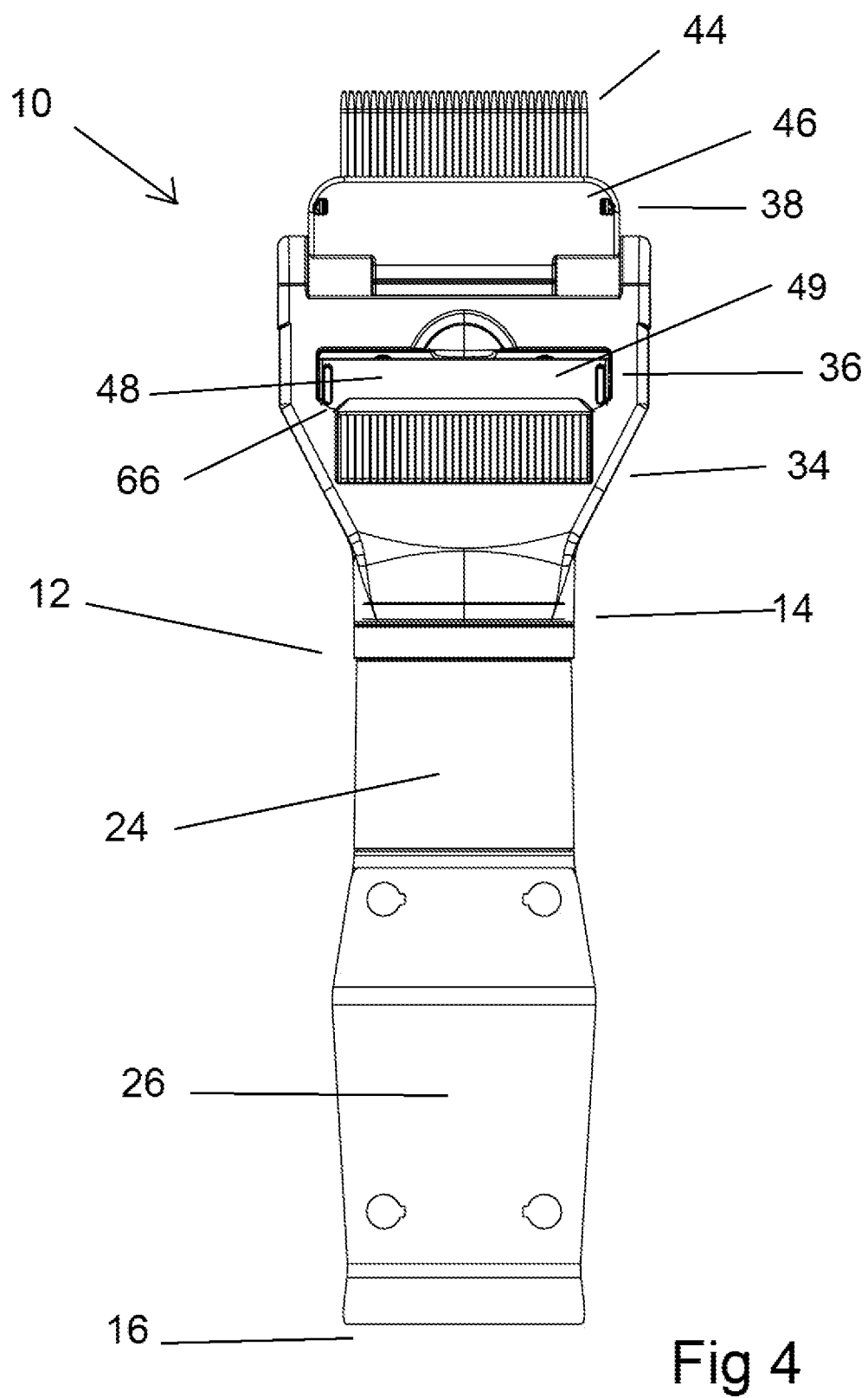
FIG. 4 is a bottom view of the lice comb of FIG. 1.
Figure 5:
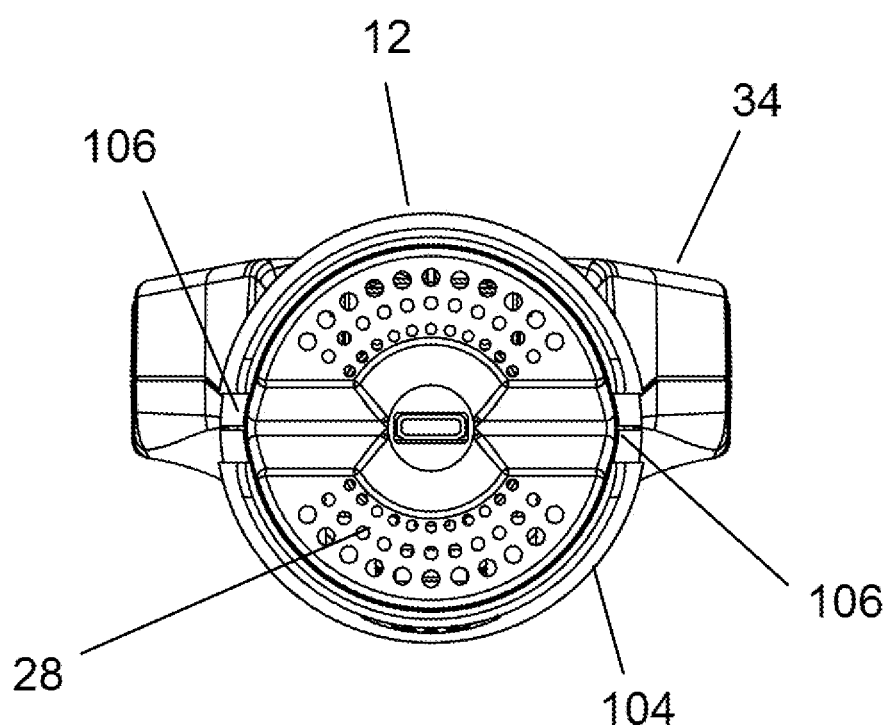
FIG. 5 is an end view of the lice comb of FIG. 1.

Referring to the Figures, there is shown a lice comb 10 comprising a main housing 12 having a first end 14 and a second end 16. The main housing 12 is circular in transverse cross section and includes a first aperture 15 at the first end 16 and a second aperture 17 at the second end 16.

The main housing 12 in the embodiment shown comprises a first housing portion 24 adjacent the first end 14 and a second housing portion 26 located adjacent the second end 16. Each of the first and second housing portions 24 and 26 comprises a tubular member of circular transverse cross section.

Figure 6:
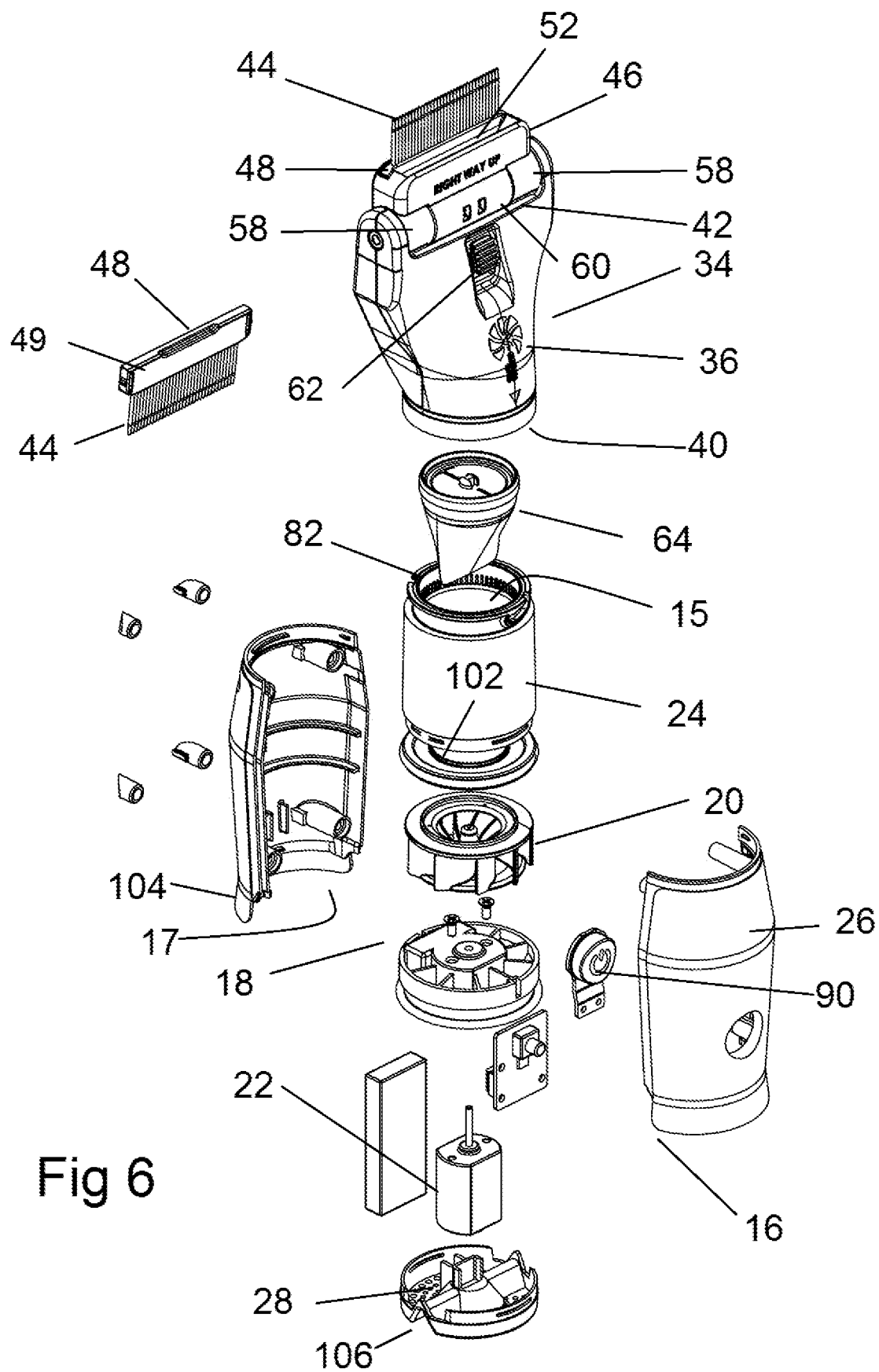
FIG. 6 is an exploded view of the lice comb of FIG. 1.

The second housing portion 26 is formed of two semi-cylindrical portions (as can be seen in FIG. 6) secured together by appropriate fasteners. The second housing portion 26 of the main housing 12 includes a fan unit 18 therein. The fan unit 18 comprises an impeller 20 driven by a motor 22. The impeller 20 is rotatable about a central longitudinal axis of the main housing 12 and oriented such that rotation of the impeller 20 draws air in through the first aperture 15 and out through the second aperture 17. That is, air is drawn by the fan unit 18 through the main housing 12 from the first end 14 to the second end 16.

The second end 16 of the main housing 12 includes an end plate 28. The end plate 28 is secured across the second aperture 17 to prevent access to the fan unit 18 and includes a plurality of holes to allow air flow. A power cord (not shown) extends through the end plate 28 and connects to the motor 22 to provide power to drive the motor 22.

A power button 90 is provided extending through the second housing portion 26. The power button 90 activates operation of the motor 22.

The first housing portion 24 comprises a tubular member having a circular transverse cross section. The main housing 12 includes a tapered portion such that the first end 14 is of a reduced cross sectional area relative to the second end 16. In the embodiment shown, the second housing portion 26 includes a tapered portion adjacent the first housing portion 24 and the first housing portion 24 is cylindrical in shape. The first housing portion 24 may be formed of a transparent material.

The lice comb 10 comprises a comb support unit 34 connectable to the first end 14 of the main housing 12. The comb support unit 34 comprises a comb support housing 36 and a comb module 38. The comb support housing 36 is hollow and includes a circular first end 40 securable to the first end 14 of the main housing 12. A second end of the comb support housing 36 includes an elongate aperture 42 therein. The comb module 38 is mounted adjacent the elongate aperture 42 in the second end of the comb support housing 36.

The comb module 38 includes a comb body 46 and a tine module 48. The tine module 48 is securable to the comb body 46 and includes a plurality of teeth 44 extending outwardly from a base 49. The comb module 38 is rotatable relative to the comb support housing 36.

Figure 7:
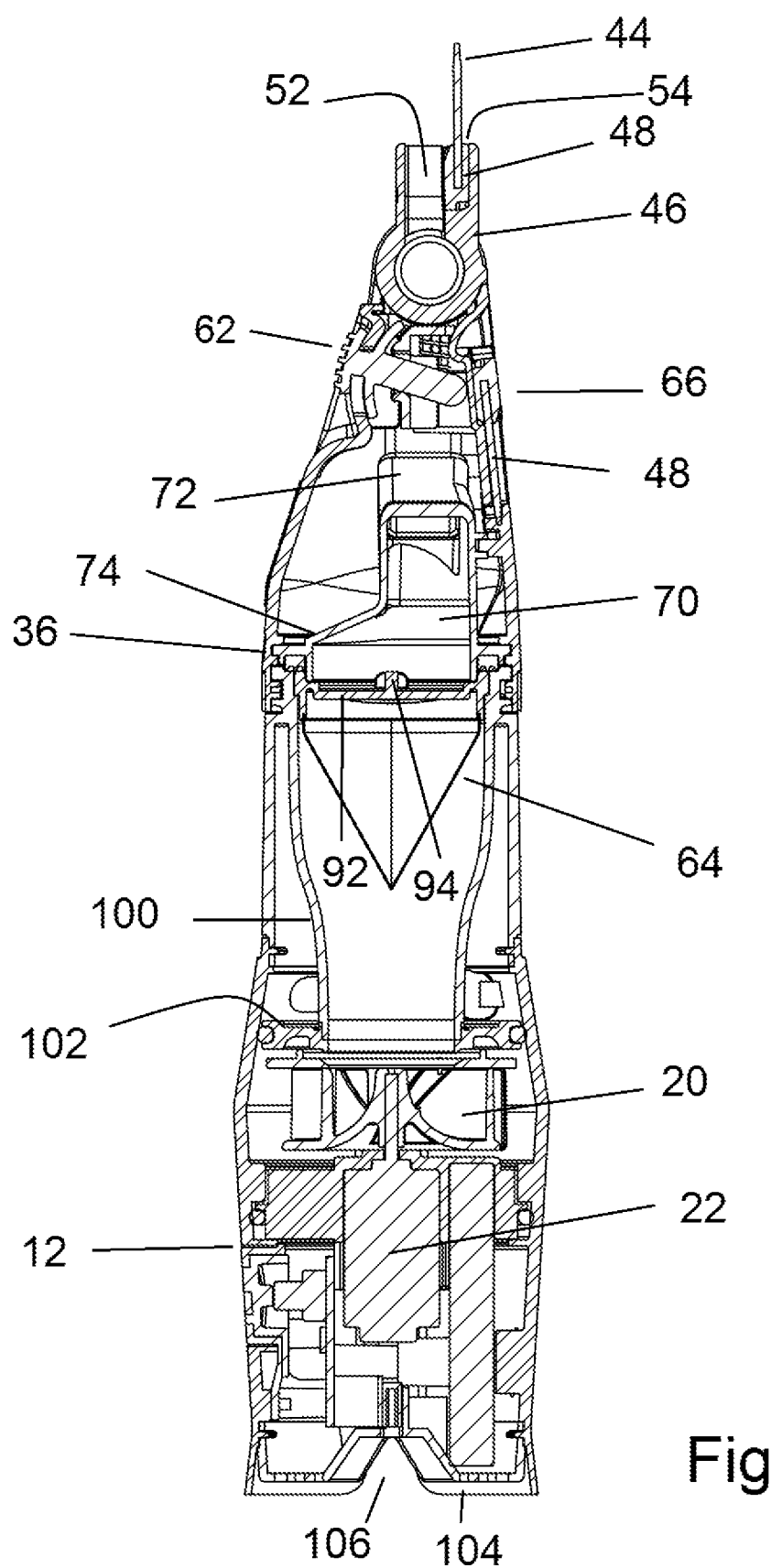
FIG. 7 is a side cross sectional view of the lice comb of FIG. 1.
Figures 8A, 8B:
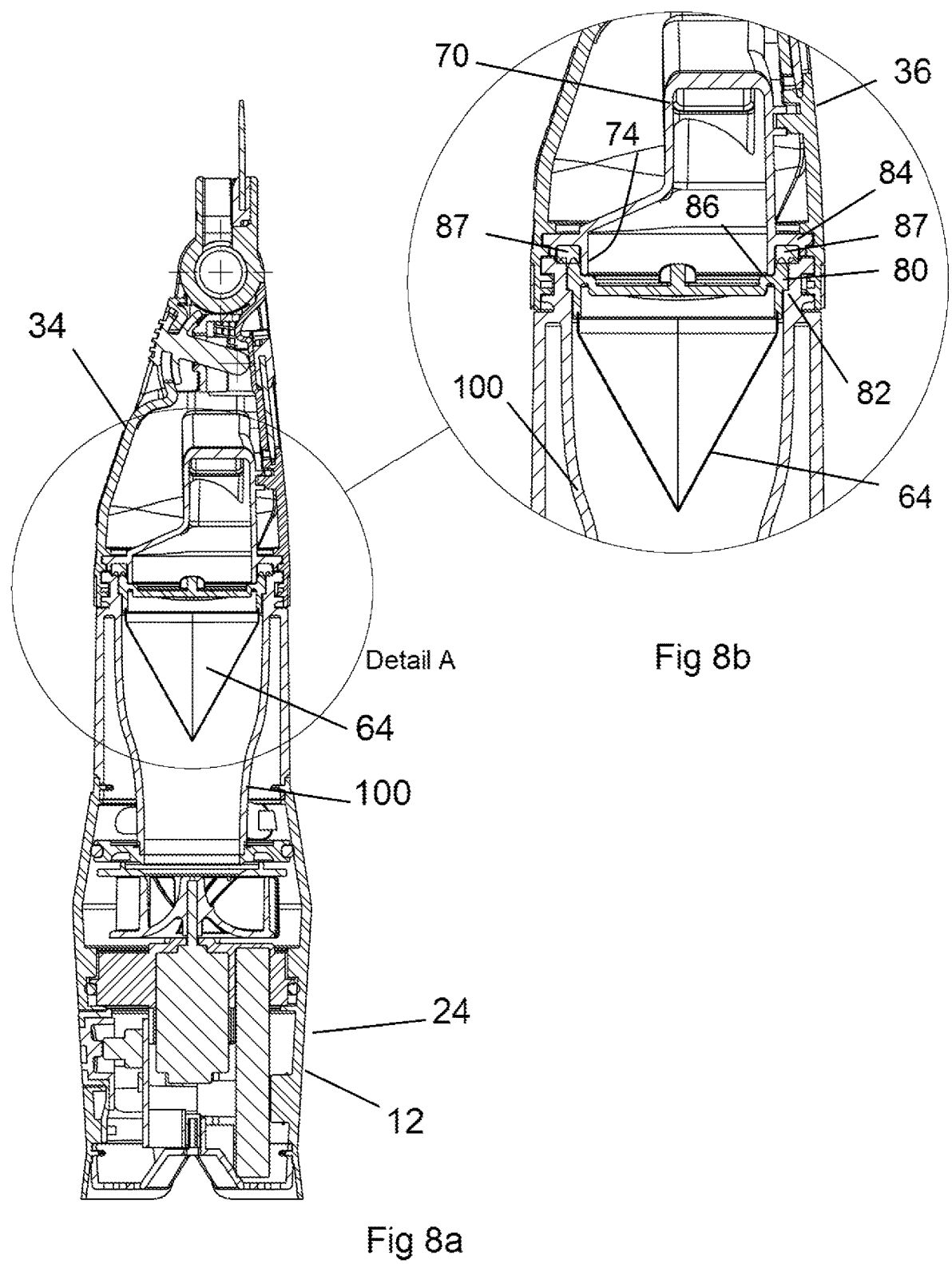
Figure 9:
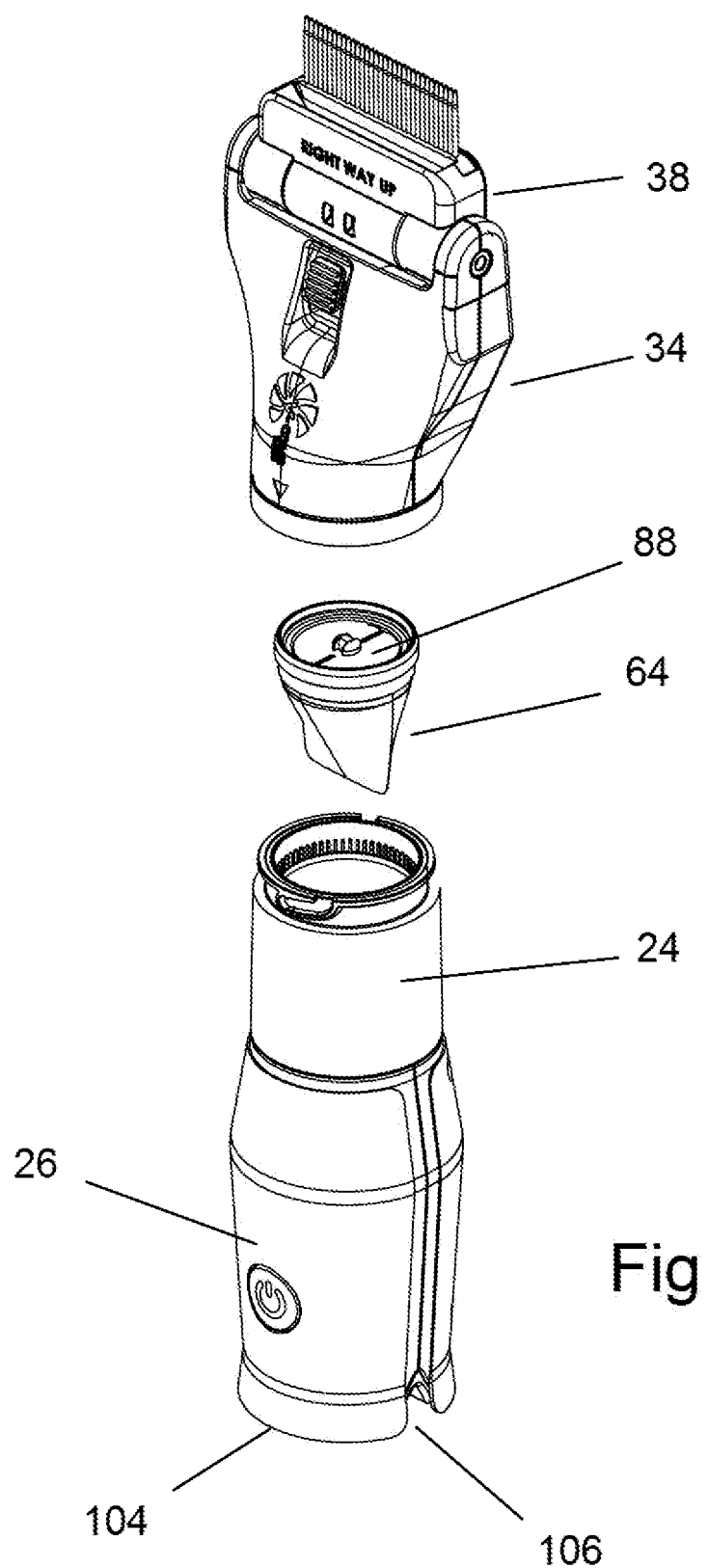
FIG. 9 is a view of the lice comb of FIG. 1 showing removal of the filter bag.
Figure 10A:
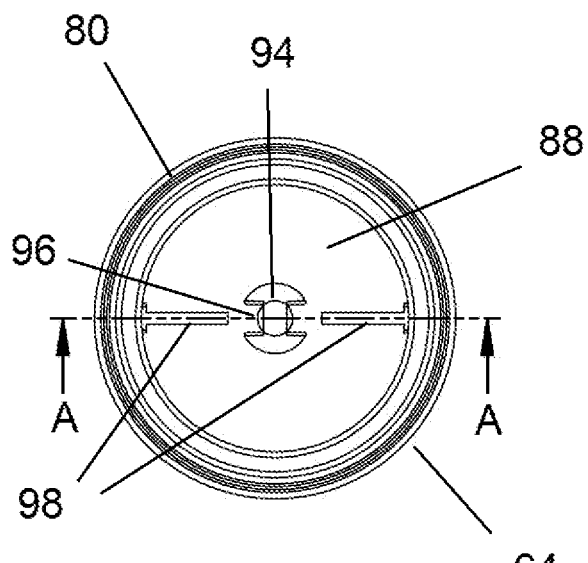
FIG. 10a is a top view of the filter bag of the lice comb of FIG. 1.
Figure 10C:
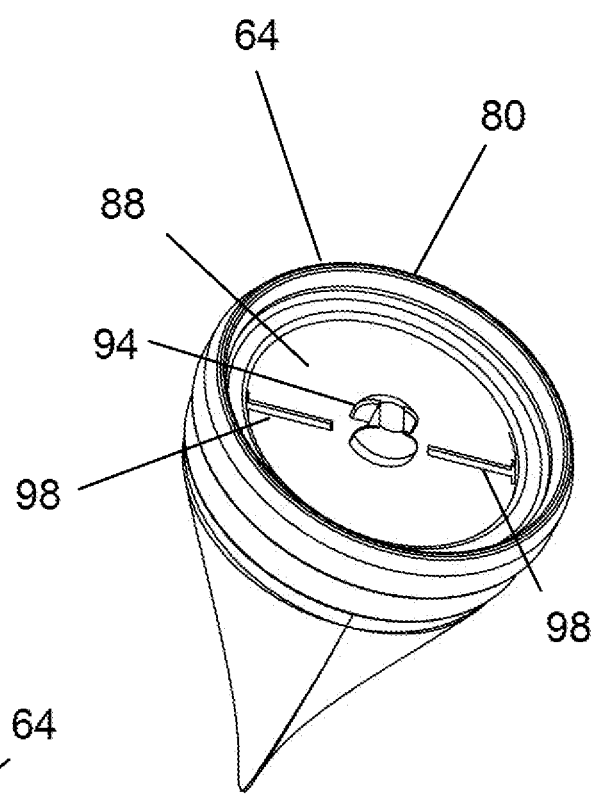
FIG. 10c is an upper perspective view of the filter bag.
Figure 10B:
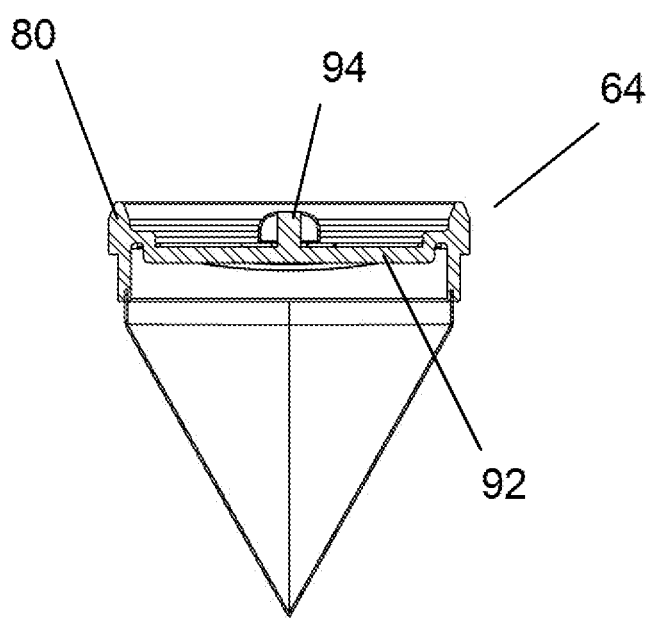
FIG. 10b is a side cross sectional view of the filter bag of FIG. 10a through the line A-A.

The comb body 46 comprises an elongate member having a channel 52 extending from a first longitudinal side to a second longitudinal side. The elongate comb body 46 is mounted across and parallel to the elongate aperture 42 in the comb support housing 36. The first longitudinal side of the comb body 46 includes also a tine slot 54. The tine slot 54 comprises an elongate slot to receive the base 49 of the tine module 48. As can be seen in FIG. 7, the tine tine slot 54 is located adjacent and parallel to the channel 52 in the comb body 46.

Figure 14A:
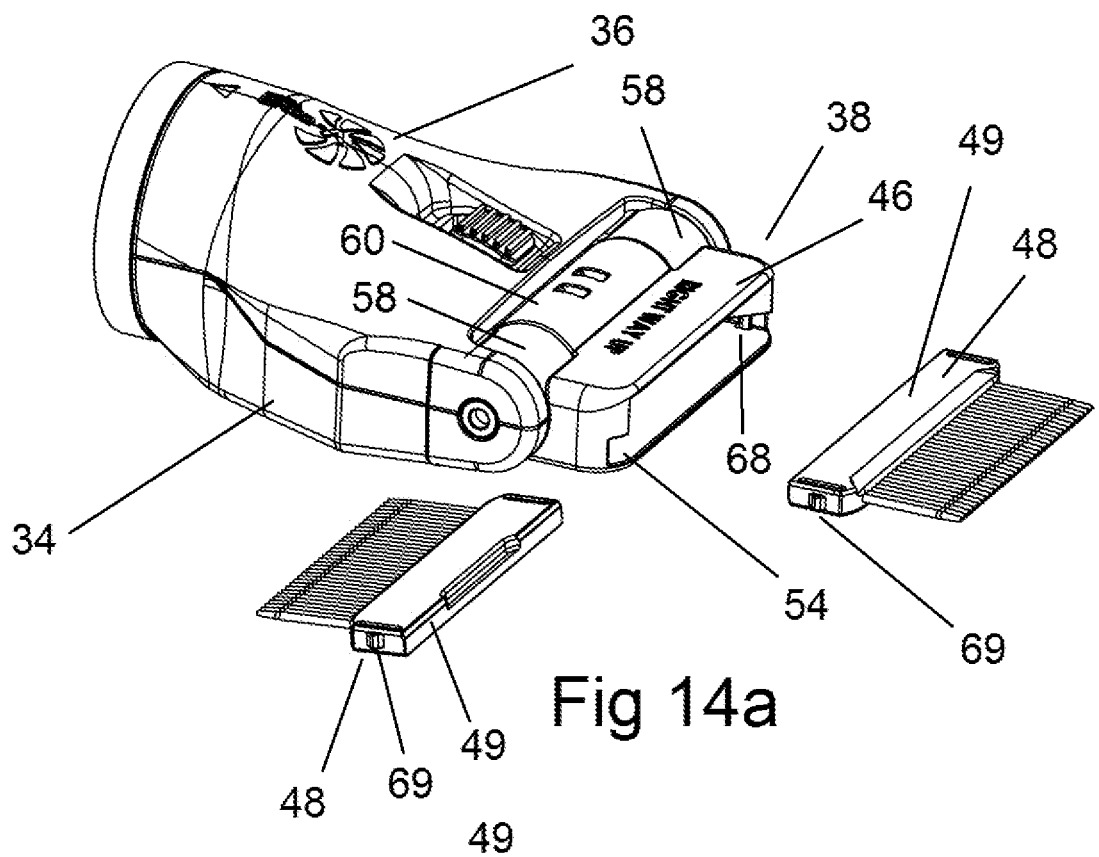
FIG. 14a is an upper perspective view of the comb support unit showing the tine modules removed.

A latching mechanism is provided such that the tine module 48 is engaged in the tine slot 54. The latching mechanism in the embodiment shown comprises notches 68 (as best seen in FIG. 14a) adjacent ends of the tine slot 54 which receive protrusions 69 on ends of the base 49 of the tine module 48.

When the tine module 48 is received in the tine slot 54, the teeth 44 extend outwardly away from the first side of the comb body 46. As can be seen in FIG. 7, the channel 52 is adjacent and parallel to a first surface of the teeth 44 on the tine module 48 such that air drawn inwardly through the channel 52 passes across the first surface of the teeth 44.

Figure 14B:
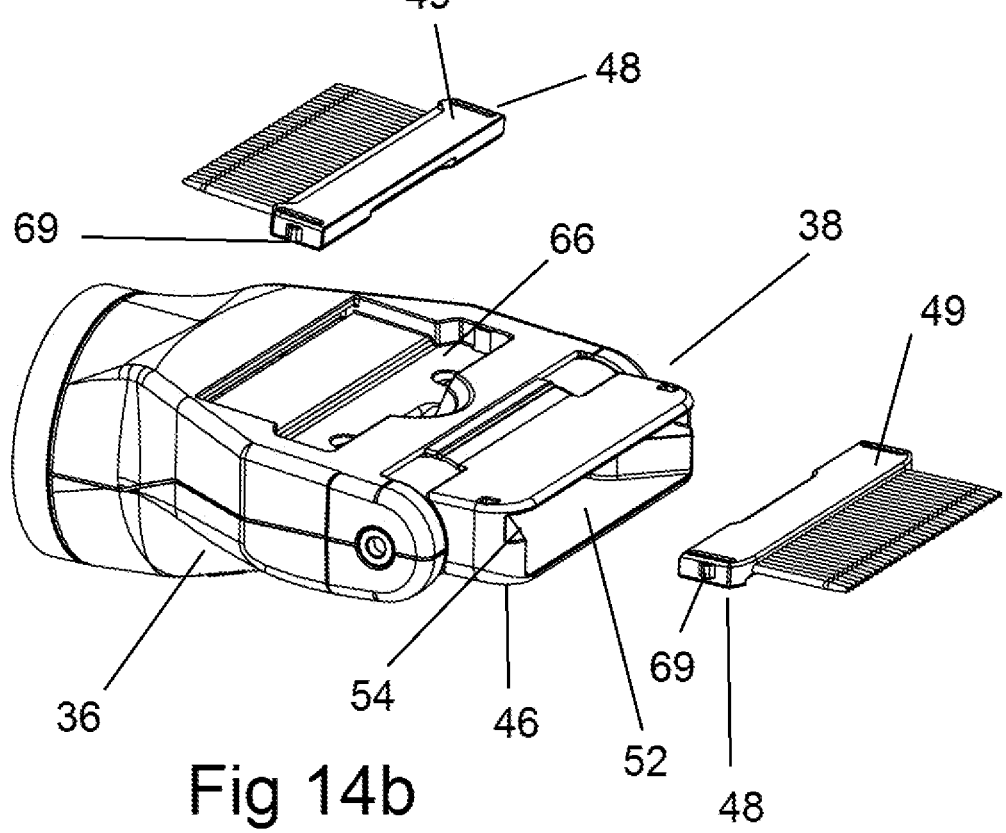
FIG. 14b is a lower perspective view of the comb support unit showing the tine modules removed.
Figure 15:
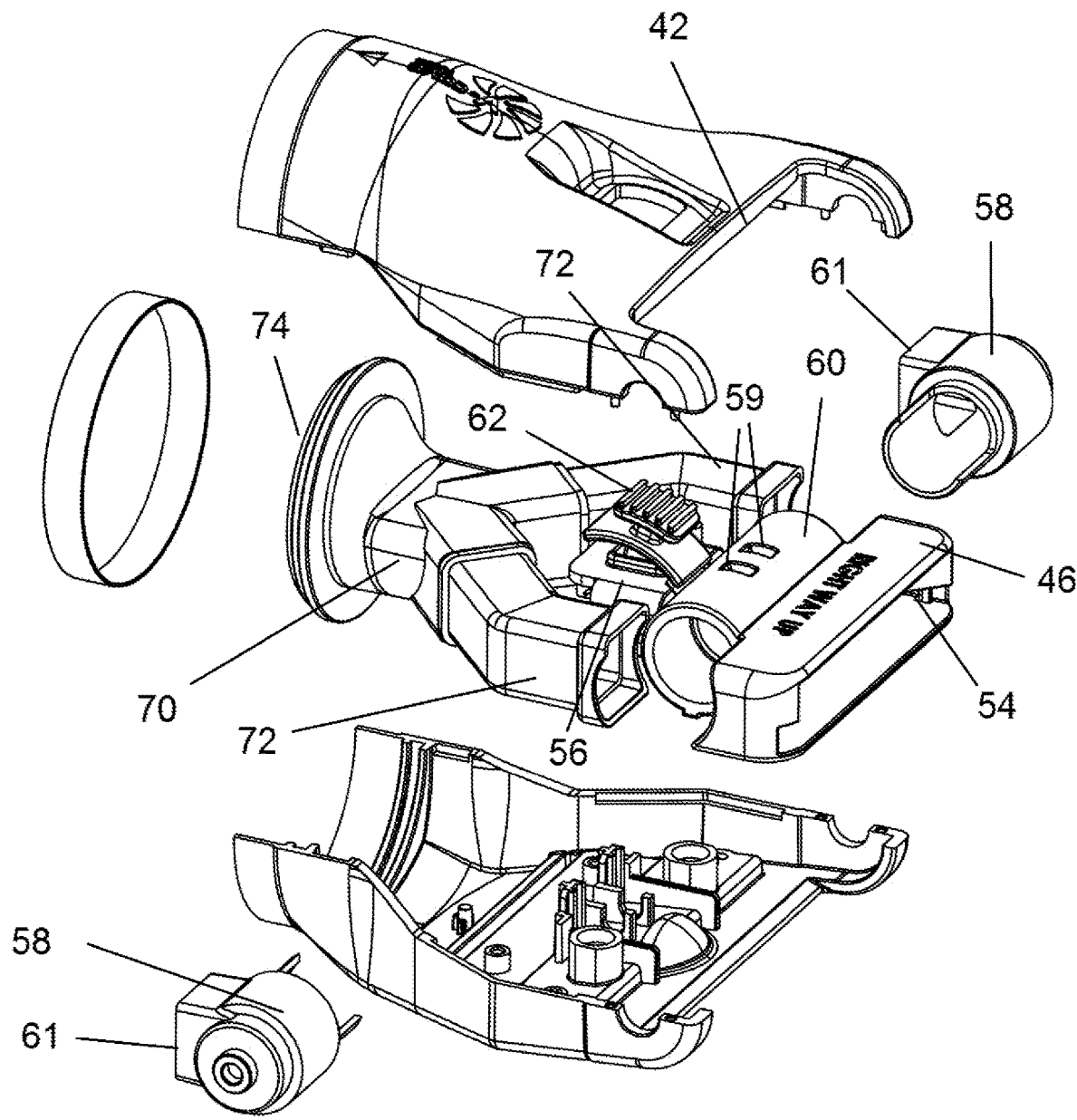
FIG. 15 is an exploded view of the comb support unit.
Figure 16:
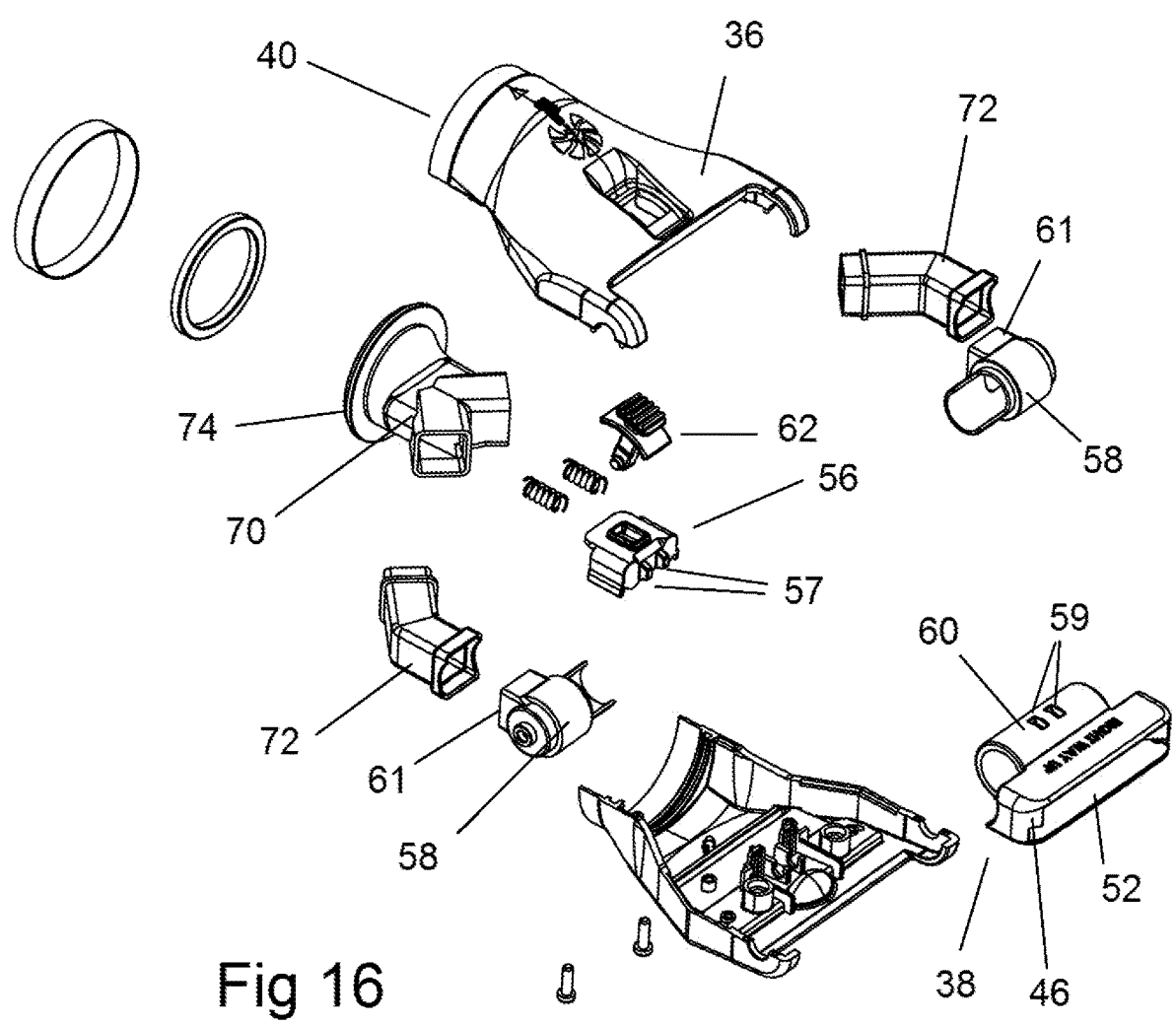
FIG. 16 is a further exploded view of the comb support unit.
Figure 17A:
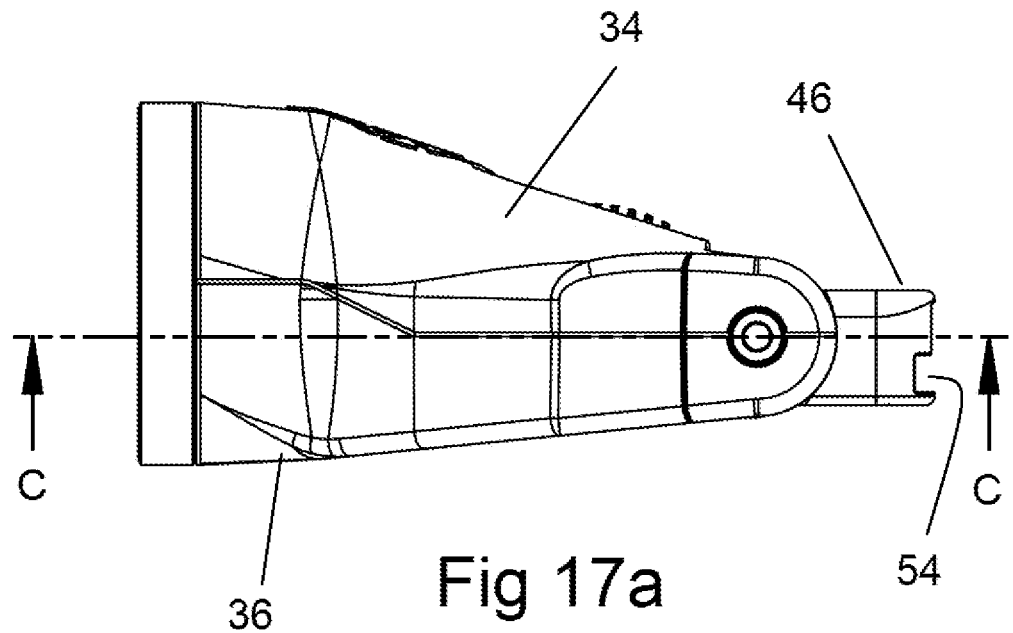
FIG. 17a is a side view of the comb support unit.
Figure 17B:
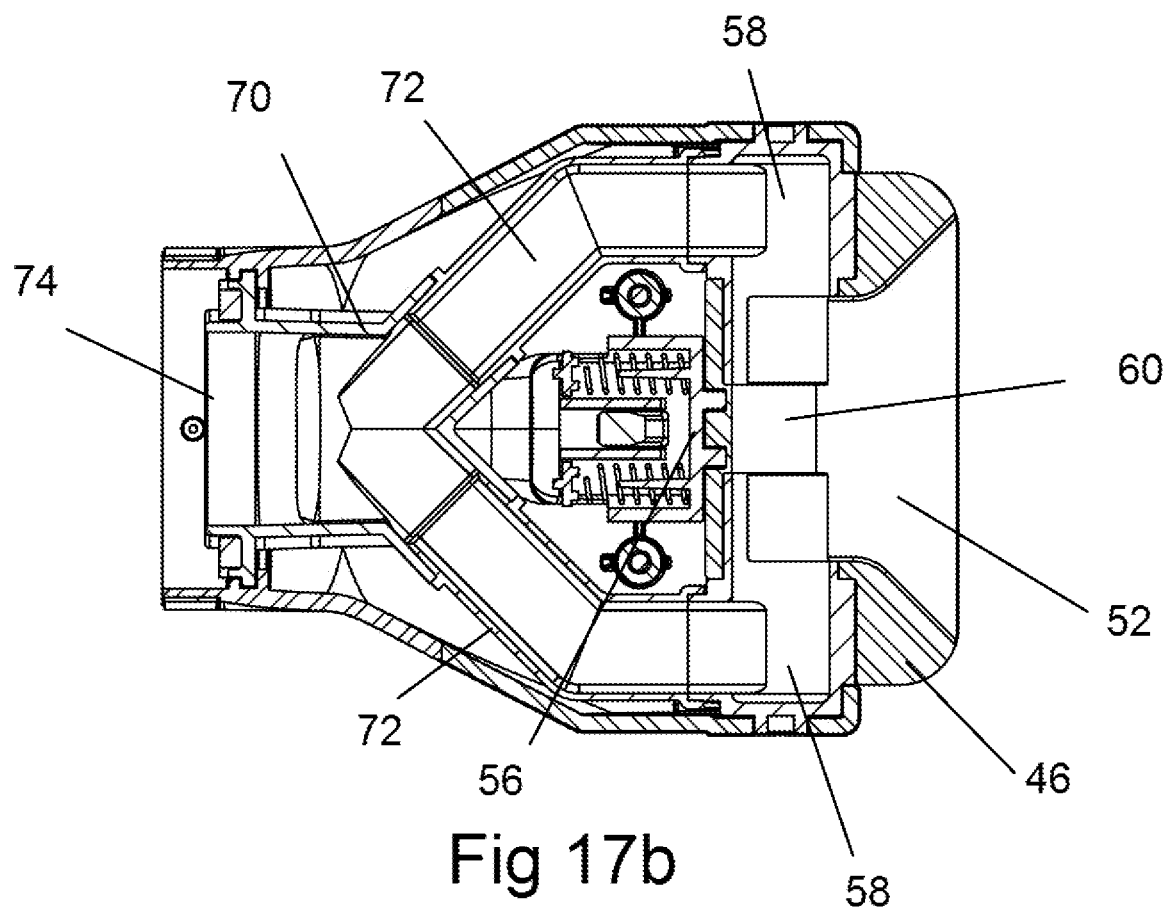
FIG. 17b is a cross sectional view of the comb support unit of FIG. 17a through the line C-C.

Multiple tine modules 48 may be provided having different sizes and dimensions of teeth 44. The most appropriate size of teeth 44 may be selected and attached to the lice comb 10 by connecting an appropriate tine module 48. Different dimensioned teeth 44 may be used for hair of different coarseness. As can be seen for example in FIG. 14b, the comb support housing 36 is provided with a tine module recess 66 in a side surface thereof. The tine module recess 66 is provided for receiving a tine module 48 such that one tine module 48 may be in use in the comb module 38 while a second tine module 48 is stored in the tine module recess 66.

The second longitudinal side of the comb body 46 is provided with a tube 60 which is provided to divert air that has passed through the channel 52. The tube 60 is secured to the second longitudinal side of the comb body 46 and comprises a cylindrical tube having a longitudinal axis oriented parallel to the longitudinal axis of the comb body 46. The tube 60 incudes a slot in a side thereof aligned with the end of the channel 52 such that air drawn through the channel 52 enters the tube 60, where it is diverted to flow outwardly towards the ends of the tube 60.

Figure 18:
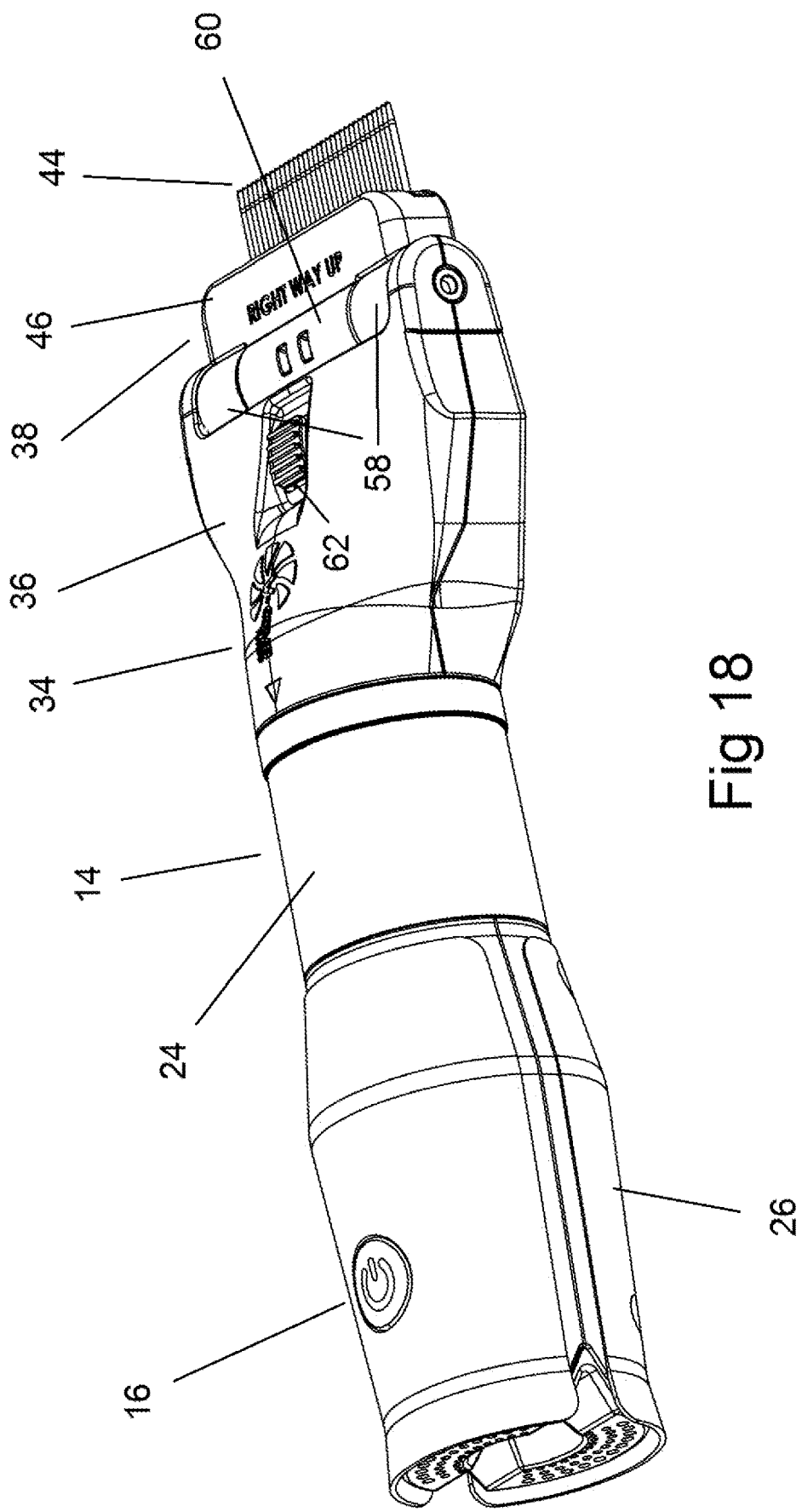
FIG. 18 is an upper perspective view of the lice comb of FIG. 1 showing the comb module in a first position.
Figure 19:
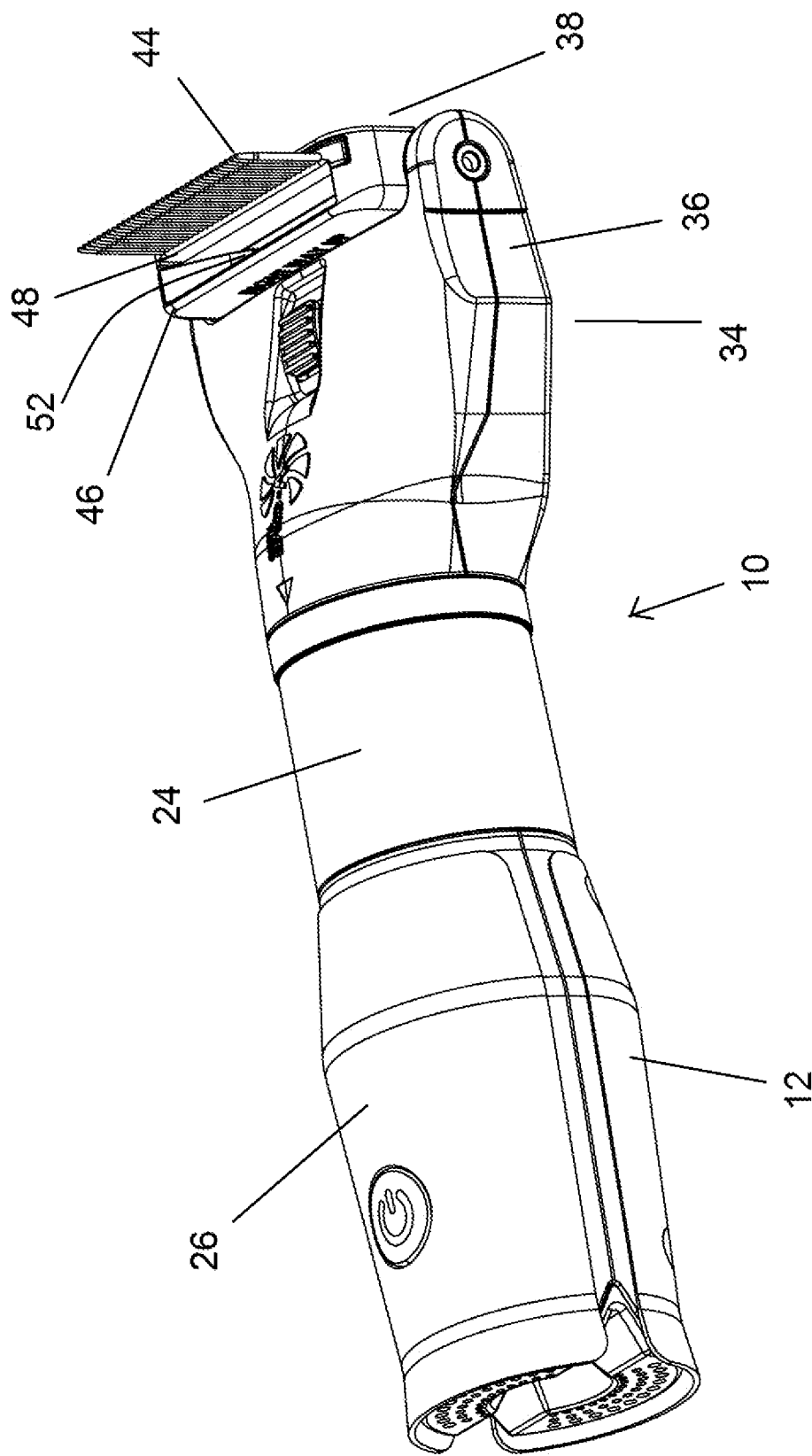
FIG. 19 is an upper perspective view of the lice comb of FIG. 1 showing the comb module in a second position.

End mounts 58 are provided at each end of the tube 60. The end mounts 58 comprise tubular members which engage into ends of tube 60 such that the tube 60 is rotatable relative to the end mounts 58. Air exiting the ends of the air tube 60 enters the end mounts 58. The comb module 38 is thereby rotatably mounted within the end of the comb support housing 36 such that the teeth 44 can move between a position in which the teeth are generally parallel to the longitudinal axis of the main housing 12 (as can be seen in FIG. 18) and one or more positions in which the teeth 44 are at an angle relative to the longitudinal axis of the main housing 12 (for example as shown in FIG. 19).

The comb module 38 is mounted for rotation relative to the comb support housing 36. The comb support unit 34 includes also a latch member 56 which is moveable to fix the comb module 38 in a plurality of angular orientations relative to the comb support housing 36. The latch member 56 is provided within the comb support housing 36 and includes lugs 57 which engage in holes 59 on the tube 60. The latch member 56 is spring biased to move towards the tube 60 and includes an actuator 62 which extends outwardly through the comb support housing 36 such that the actuator 62 can be slid to move the latch member 56 away from the tube 60, thereby disengaging the lugs 57 from the holes 59 to allow rotation of the comb module 38.

The comb support housing 36 includes also an internal first conduit 70. The internal first conduit 70 comprises a tube having a pair of tube portions 72 at a first end thereof. The tube portions 72 extend away from each other at an angle such that the first conduit 70 is Y-shaped. The first conduit 70 includes a circular second end 74 provided adjacent the first end 40 of the comb support housing 36. The tube portions 72 each attach to one of the end mounts 58. Each of the end mounts 58 comprises a cylindrical tube being open at a first end and closed at a second end. The first end connects to the tube 60 such that air flowing from the tube 60 enters an internal chamber of the end mount 58. The end mounts 58 include also ports 61 on sides thereof adjacent the second ends. The ports 61 connect to ends of the tube portions 72 such that air flowing into the end mount 58 passes into the tube portions 72 and then outwardly from the second end of the first conduit 70. The first conduit 70 thereby funnels any matter passing through the channel 52 of the comb body 46 to the first end 40 of the comb support housing 36.

The lice comb 10 includes also a filter bag 64 received in the main housing 12 adjacent the first end 14 thereof. The filter bag 64 includes an open first end and a closed second end. In the embodiment shown, the filter bag 64 tapers inwardly towards the second end thereof. The filter bag 64 is received in the first aperture 15 such that the first end thereof is located adjacent the first aperture 15 and the filter bag 64 is contained within the first housing portion 24.

The filter bag 64 includes a outer rim 80 around the first end thereof. The first end of the main housing 12 includes a circular groove 82 complementary in shape to the outer rim 80 such that the outer rim 80 may be received into the groove 82. The second end 74 of the internal first conduit 70 of the comb support unit 34 is dimensioned to be received within the outer rim 80 of the filter bag 64. The outer rim 80 includes a lip portion 86 on an inner surface thereof on which the second end 74 of the internal first conduit 70 engages when the comb support unit 34 is attached to the main body 12.

Also, the second end 74 of the first conduit 70 includes an outer flange 84 having an annular channel therein on a side facing the main housing 12. A circular seal 87 is provided within the channel of the outer flange 84. The seal 87 is positioned such that an end of the outer rim 80 of the filter bag 64 engages with the seal 87. With this arrangement, all air drawn in through the first conduit 70 passes through the filter bag 64.

The lice comb 10 includes a gate valve provided to restrict lice captured within the filter bag 64 exiting the filter bag 64. The gate valve comprise a flexible cover 88 provided across the open first end of the filter bag 64. The first end of the filter bag 64 is provided with a cross member 92 extending diametrically across the first end of the filter bag 64. The cross member 92 includes a lug 94 received through a hole 96 in the flexible cover 88.

The flexible cover 88 includes slots 98 extending inwardly from opposed sides thereof such that the slots 98 are located to extend above and along the cross member 92. The arrangement of the slots 98 aids in allowing the flexible cover 88 to be drawn inwardly into the filter bag 64 on either side of the cross member 92 by the flow of air. The flexible cover member 88 therefore opens when the lice comb 10 is operating to allow captured lice to enter the filter bag 64.

Figure 11A:
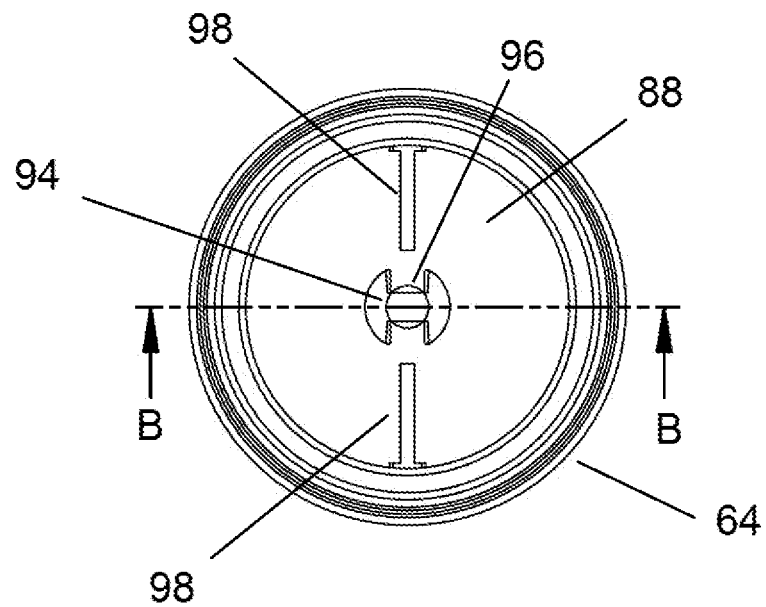
FIG. 11a is a top view of the filter bag.
Figure 11B:
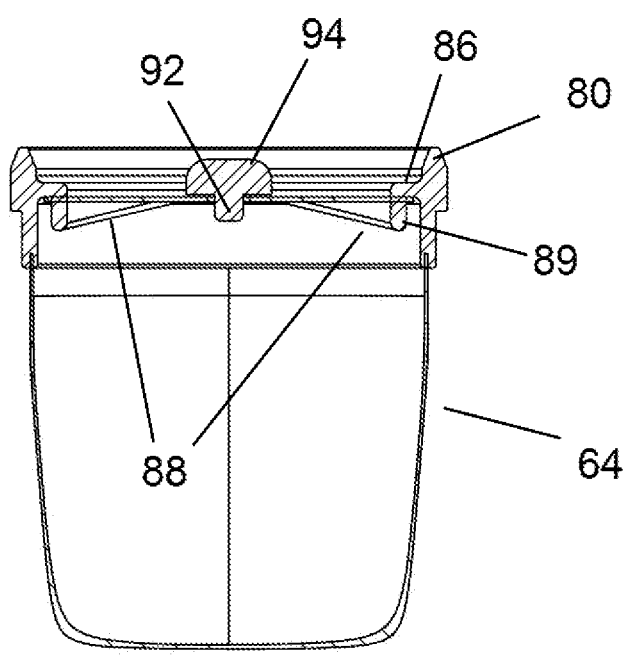
FIG. 11b is a cross sectional view of the filter bag of FIG. 11a through the line B-B.
Figure 12:
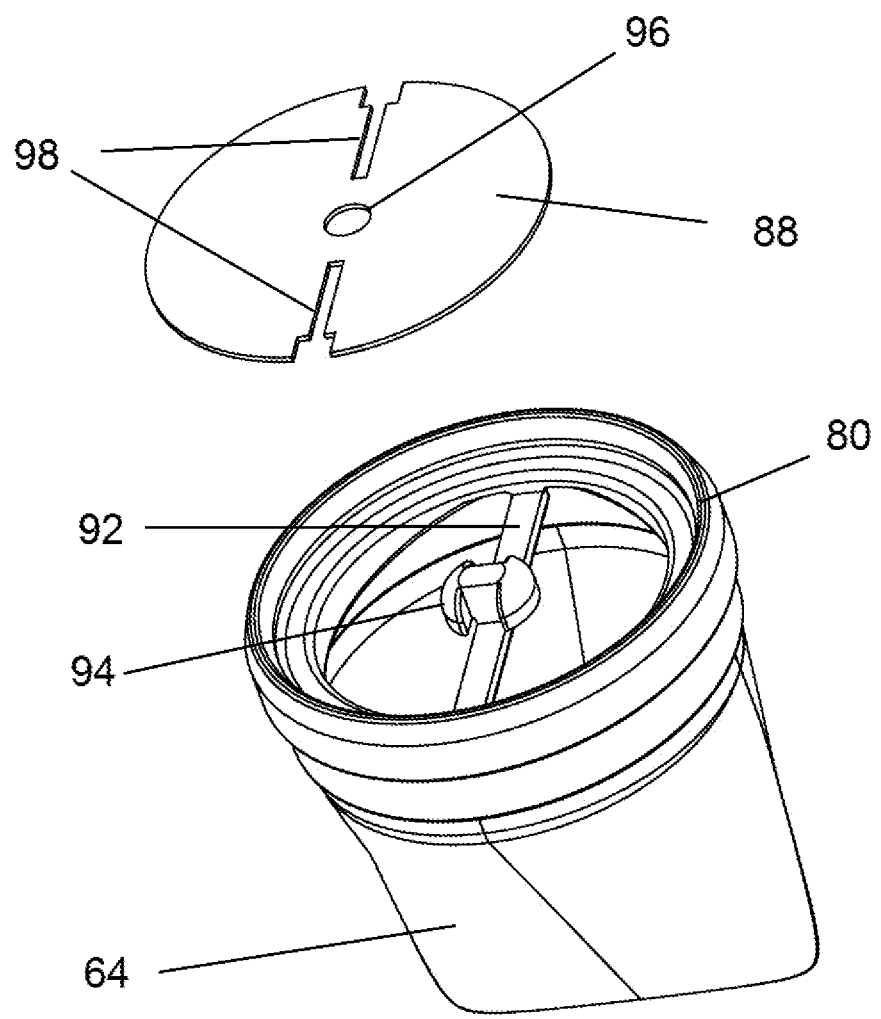
FIG. 12 is a view of the filter bag showing the flexible cover removed.
Figure 13A:
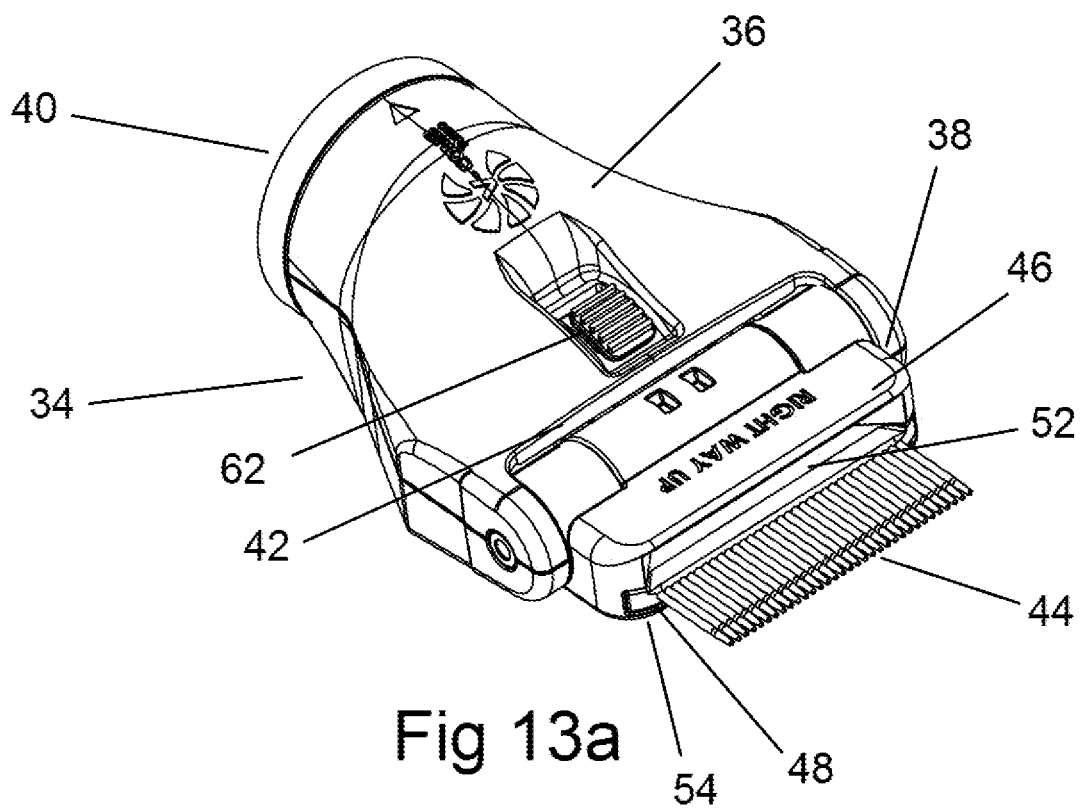
FIG. 13a is an upper perspective view of the comb support unit of the lice comb of FIG. 1.
Figure 13B:
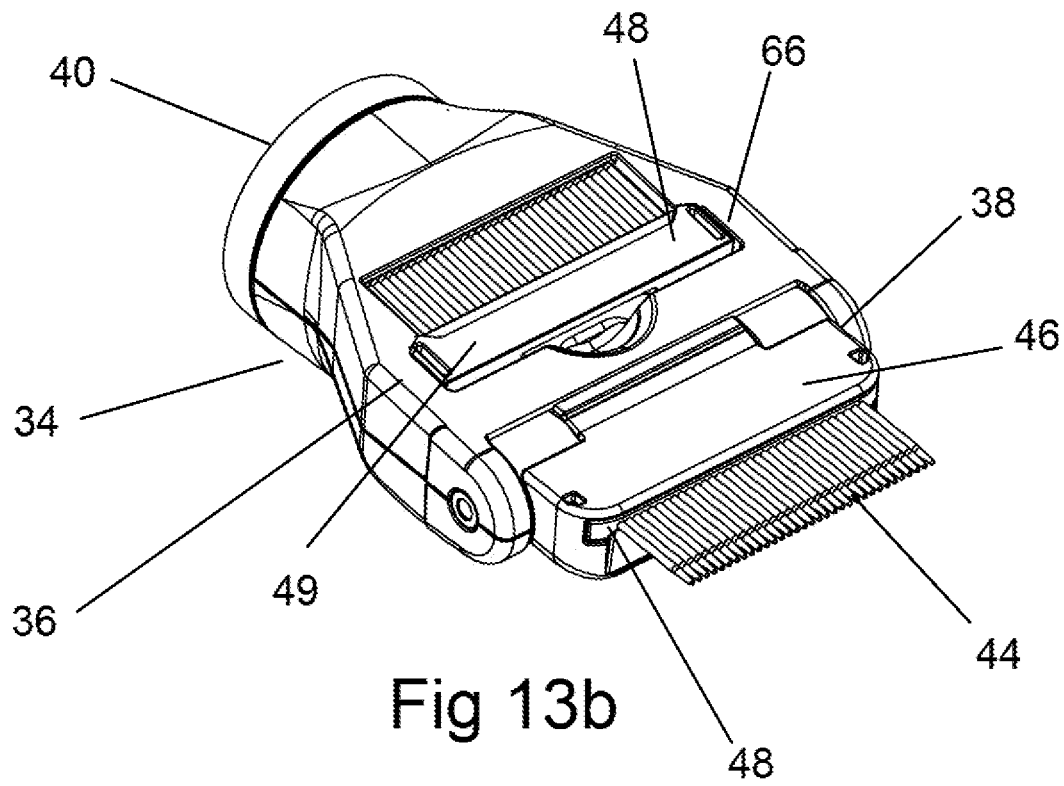
FIG. 13b is a lower perspective view of the comb support unit.

As can be seen in FIG. 11b, the lip portion 86 of the outer rim 80 of the filter bag 64 includes an inner rim 89 extending towards an interior of the filter bag 64. The periphery of the flexible cover 88 is located under this inner rim 89 (as can be seen in FIG. 11b) such that sides of the flexible cover 88 either side of the cross member 92 are flexed downwardly. The flexible cover 88 is formed from a resilient material such that it will tend to move towards a planar state. The flexible cover 88 therefore pushes upwardly against the lower edge of the inner rim 89 to seal around the periphery of the flexible cover 88.

The main housing 12 includes also an internal second conduit 100. The second conduit 100 includes a first end being integrally formed with the groove 82 in the first end of the main housing 12 and extending through the first housing portion 24 and to a second end within the second housing portion 26 adjacent the impeller 20. The second conduit 100 therefore directs air flowing outwardly through the surface of the filter bag 64 to adjacent the impeller 20. The second internal conduit 100 tapers inwardly from the first end to the second end thereof.

A face plate 102 is provided on a side of the impeller 20 adjacent the second internal conduit 100. The face plate 102 includes an opening therein such that the second end of the second internal conduit 100 engages around the periphery of the opening in the face plate 102. The face plate 102 thereby cooperates with the second internal conduit 100 to improve the flow of air through from the lice comb 10.

The end plate 28 provided in the second end 16 of the main housing 12 is set inwardly from the second end 16 such that a cylindrical rim portion 104 is defined around the second end 16. The rim portion 104 includes one or more notches 106 therein. The notches 106 are provided such that the power cord extending outwardly through the end plate 28 can pass through one of the notches 106 while the lice comb 10 is standing on a surface on the cylindrical rim portion 104.

In use, a filter bag 64 is inserted into the first housing portion 24 and the blade unit 38 of the comb module 38 moved to the most appropriate orientation for use. The fan unit 18 is activated and air is drawn across the surface of the teeth 44 and into the channel 52. The air drawn in through the channel 52 passes through the filter bag 64 and out through the second end 16 of the main housing 12. Any lice captured on the surface of the teeth 44 are thereby drawn into the filter bag 64 and trapped. When the filter bag 64 is to be replaced, the comb support unit 34 is disconnected from the main housing 12. The arrangement of the filter bag 64 means it can simply be tipped from the main housing 12 by tilting the main housing 12. The filter bag 64 can therefore be tipped directly into a bin without the need for the operator to touch it and a new filter bag 64 simply dropped into place.

It will be readily apparent to persons skilled in the relevant arts that various modifications and improvements may be made to the foregoing embodiments, in addition to those already described, without departing from the basic inventive concepts of the present invention.

What is claimed is:

1. A lice comb comprising:
    a main housing including a first aperture at a first end thereof and a second aperture at a second end thereof;
    a fan unit having an impeller provided within the main housing to draw air in through the first aperture and expel air outwardly through the second aperture; and
    a comb module securable to a comb support unit adjacent a first end of the main housing, the comb module comprising a comb body and a plurality of teeth, the comb body having a channel such that air drawn in through the channel passes across the teeth;
    wherein a filter bag is receivable in a first end of the main housing, the filter bag including a rim around an open first end thereof to be received in a groove in the first end of the main housing such that the filter bag may be released from the main housing by tipping the main housing;
    wherein the comb body is provided with a tube to receive and divert air that has passed through the channel and wherein the tube is mounted for rotation relative to the main housing to allow the orientation of the teeth to be varied;
    wherein ends of the tube are rotatably mounted to end mounts, the end mounts having internal chambers to receive air that has passed through the tube.

2. The lice comb in accordance with claim 1, wherein a flexible cover is provided across the open first end of the filter bag.

3. The lice comb in accordance with claim 2, wherein the open first end of the filter bag is provided with a cross member extending diametrically across the open first end of the filter bag having a lug received through a hole in the flexible cover.

4. The lice comb in accordance with claim 3, wherein the flexible cover includes slots extending inwardly from opposed sides thereof such that the slots are located to extend above and along the cross member to allow the flexible cover to be drawn inwardly into the filter bag on either side of the cross member by the flow of air.

5. The lice comb in accordance with claim 4, wherein the periphery of the flexible cover is received under an inner rim provided on the filter bag.

6. The lice comb in accordance with claim 1, wherein the comb support unit includes a comb support housing, the comb module being secured adjacent a first end of the comb support housing, and wherein a first internal conduit is provided within the comb support housing having a first end adjacent the end mounts to transfer air from the end mounts to a second end of the comb support housing.

7. The lice comb in accordance with claim 6, wherein a second end of the first internal conduit includes an outer flange having an annular channel therein on a side facing the main housing, the channel including a seal against which an end of the rim of the filter bag engages.

8. The lice comb in accordance with claim 6, wherein the end mounts each comprise a cylindrical tube being open at a first end and closed at a second end and having a port on a side thereof adjacent the second end which connects to ends of the tube portions.

9. The lice comb in accordance with claim 8, wherein the main housing includes a second internal conduit such that a first end thereof is integrally formed with the groove in the first end of the main housing and a second end is located adjacent the impeller.

10. The lice comb in accordance with claim 9, wherein a face plate is provided on a side of the impeller adjacent the second internal conduit, the face plate including an opening therein such that the second end of the second internal conduit engages around the periphery of the opening in the face plate.

11. The lice comb in accordance with claim 1, wherein an end plate provided in the second end of the main housing is set inwardly from the second end such that a cylindrical rim portion is defined around the second end, the rim portion including one or more notches such that a power cord may extend outwardly through one of the notches while the lice comb is standing on the cylindrical rim portion.

12. The lice comb in accordance with claim 1, wherein the main housing comprises a first housing portion adjacent the first end and a second housing portion located adjacent the second end and the first portion comprises a transparent material.

13. A lice comb comprising:
    a main housing including a first aperture at a first end thereof and a second aperture at a second end thereof;
    a fan unit having an impeller provided within the main housing to draw air in through the first aperture and expel air outwardly through the second aperture; and
    a comb support unit comprising a comb support housing and a comb module provided adjacent a first end of the main housing, the comb module comprising a comb body and a plurality of teeth, the comb body having a channel such that air drawn in through the channel passes across the teeth;
    wherein the comb module is secured adjacent a first end of the comb support housing and a first internal conduit is provided within the comb support housing to transfer air from the channel to a second end of the comb support housing;
    wherein the comb body is provided with a tube to receive air that has passed through the channel and wherein the tube is mounted for rotation relative to the main housing to allow the orientation of the teeth to be varied;
    wherein ends of the tube are rotatably mounted to end mounts, the end mounts having internal chambers to receive air that has passed through the tube.

14. The lice comb in accordance with claim 13, wherein the first internal conduit is provided within the comb support housing to transfer air from the end mounts to the second end of the comb support housing.

15. The lice comb in accordance with claim 14, wherein the first internal conduit is Y-shaped and includes a pair of tube portions at a first end thereof to connect to the end mounts.

16. The lice comb in accordance with claim 13, wherein the main housing comprises a first housing portion adjacent the first end and a second housing portion located adjacent the second end and the first portion comprises a transparent material.

\* \* \* \* \*